United States Patent [19]

Wakabayashi

[11] 3,750,559
[45] Aug. 7, 1973

[54] COFFEE MAKING BOTTLE AND METHOD FOR MAKING SAME

[76] Inventor: Hideo Wakabayashi, 34-6, 5-chome, Yoyogi, Shibuya-ku, Tokyo, Japan

[22] Filed: Oct. 26, 1971

[21] Appl. No.: 192,225

[52] U.S. Cl. .................................. 99/279, 99/316
[51] Int. Cl. .............................. A47j 31/00
[58] Field of Search................... 99/323, 316, 317, 99/298, 296, 295, 77.1, 320, 287, 28, 279

[56] References Cited
UNITED STATES PATENTS

| | | | |
|---|---|---|---|
| 918,674 | 4/1909 | Hathaway | 99/323 |
| 2,034,956 | 3/1936 | Pfeiffer | 99/323 |
| 2,403,691 | 7/1946 | States | 99/279 |
| 3,336,857 | 8/1967 | Knodt | 99/295 |

*Primary Examiner*—Robert W. Jenkins
*Attorney*—E. F. Wenderoth and V. M. Creedon et al.

[57] ABSTRACT

Coffee making bottle consisting of two separated parts of upper and lower members, each being partitioned by a filter paper to form a coffee extraction chamber and filtration chamber.

2 Claims, 3 Drawing Figures

PATENTED AUG 7 1973

3,750,559

HIDEO WAKABAYASHI,
INVENTOR

BY Wenderoth, Lind & Ponack
ATTORNEYS

COFFEE MAKING BOTTLE AND METHOD FOR MAKING SAME

This invention relates to a method and apparatus for making coffee in a very simple manner without losing aroma from coffee as extracted.

There are known three typical ways of making coffee, i.e., dripping, percolating, and siphoning. The very common features among these coffee making methods are that roasted and ground coffee beans are treated with heated water to extract the coffee essence under a substantially open condition.

Take the dripping method, for example, the roasted and properly ground coffee beans are placed in filtering paper or cloth, or in a particular dripping device (or dripper) having a plurality of small holes, through which extracted coffee essence drip down into cup or other receptacle, then hot water is poured onto the coffee beans to extract the coffee essence in the course of the hot water passing through the ground coffee beans, and the thus extracted coffee essence is filtered through the paper or cloth, and drips down into the receptacle. Important, in this case, to extract the coffee essence in the most effective manner is that, irrespective of the amount of the material coffee powder and the pouring hot water, the extraction and filtration of the total hot water poured in should preferably be completed in approximately 3-minute period. In view of the fact that this type of the coffee extracting and filtering method is always carried out in open condition, i.e., the extraction is conducted in open air, adjustment of the time period starting from the hot water pouring to the completion of the filtration solely depends upon the skill of a person who makes coffee.

In these known methods, however, when the quantity of coffee powder is as small as to serve only a few persons, hence a small quantity of hot water to be poured, the extraction and filtration finish so early that insufficient extraction of the coffee aroma will result. In this case, if the filtration speed is lowered by limiting the size and number of the filtration holes or mesh of the filter paper or cloth, even undersirable components contained in the coffee beans such as tannin, etc. are extracted with the result that astringency (or roughness) is added to the filtered coffee liquid, and, at the same time, due to slow filtering speed, temperature of the coffee liquid goes down. Such coffee liquid of lowered temperature, if re-heated to a temperature suitable for drinking, it loses limpidity and changes its taste badly.

Furthermore, in these methods, on account of treating the ground coffee beans with hot water of boiling condition in open air, the aroma of coffee dissipates to remarkably degrade its quality as the drinking beverage. Also, when the coffee powder is treated with hot water is open air, the water should stay long with the coffee until sufficient extraction of coffee essence completes, or, if it is desired to extract coffee in a rather short time, they must be boiled together. In either case, however, undesirable astringency or roughness accompanies the required aroma in the coffee liquid as extracted and filtered. There is no way of preventing the quality of extracted coffee from lowering. Even the percolating method, in which heated coffee liquid is circulated within the percolater through the coffee powder, has such disadvantages that the coffee liquid loses its limpidity as well as coffee aroma, and its taste remarkably deteriorates.

As mentioned in the foregoing, these known coffee making methods are difficult to extract coffee liquid having both desired consistency and aroma from a rather small amount of coffee powder, except for using a large amount of coffee powder for sufficient extraction, although, even in the latter case, extraction of the undesirable ingredients contained in the coffee beans are unavoidable. Moreover, known types of extracting and filtering devices are troublesome in cleaning and washing after use. In particular, the filter cloth for the dripping and siphoning methods has such disadvantage that, unless it is continuously used, leftovers of the coffee powder tend to issue very disagreeable smell. Under the present situation, therefore, there exists not a single coffee making device capable of extracting coffee essence in a most ideal manner as well as facilitating washing and cleaning after use.

It is therefore an object of the present invention to provide an improved method of making coffee in a simple but in a most ideal manner.

It is another object of the present invention to provide an improved coffee making device capable of extracting and filtering coffee liquid having both desired consistency and excellent coffee aroma without accomapnying any undesirable ingredients in the coffee beans irrespective of the quantity of the material coffee powder and hot water to be poured thereon.

The foregoing objects and other objects of the invention as well as the details thereof will become more apparent from the following description when read in conjunction with the accompanying drawings.

Figures 1, 2:
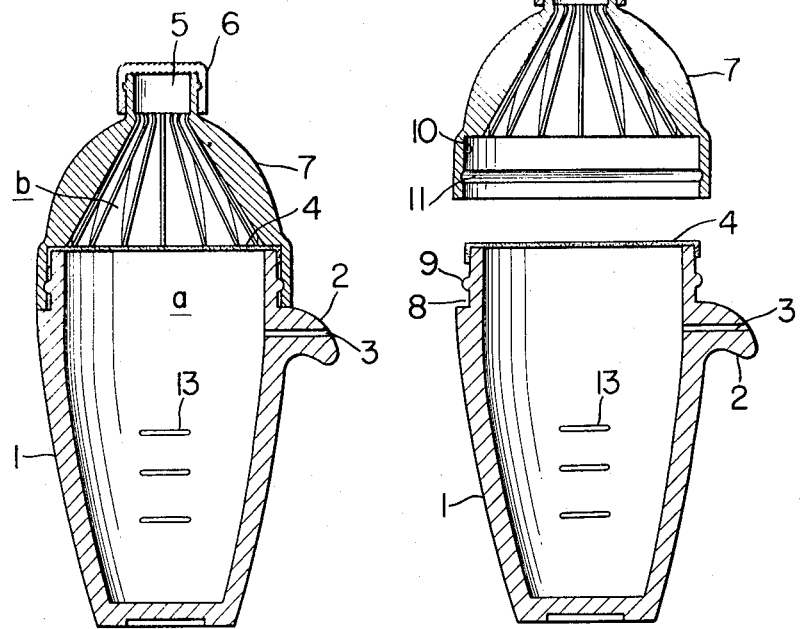
FIG. 1 is a longitudinal, cross-sectional view showing the entire construction of the coffee extracting and filtering device according to the present invention.
FIG. 2 is also a longitudinal cross-sectional view of the device in FIG. 1 above, in which the lower part (main body) and the upper part are shown to be separated.

Referring to FIG. 1, the coffee extraction and filtration device according to the present invention consists of a cylindrical main body 1 with one end open to define a cavity space $a$ therein and constituting a lower member, and a capping body 7 which constitutes the upper member with respect to the lower member 1, and can be detachably engaged with the lower member at their respective peripheral edges.

The lower member 1 is provided at an appropriate position on the surrounding wall thereof with a protrusion 2 having therein a small through-hole or port 3 which makes the internal space of the lower member 1 communicable with the external air. This protrusion also serves as a hook for a finger, when holding the device at the time of coffee making.

The upper member, or capping member, 7 is in a funnel shape with both ends open, the broader opening engaging with the upper peripheral edge of the lower member 1, and the narrower opening 5 constituting the topmost portion of the extraction and filtration member, when both lower and upper members are coupled.

The narrower or top opening 5 of the upper member 7 is further closed with a capping member 6 at the time of the coffee making so as to prevent the coffee aroma from escaping.

The opening defined by the upper peripheral edge of the lower member 1 is covered with a filtration paper 4 of heat-resisting and gas-and-liquid-permeating quality, in which state the upper member 7 is tightly engaged therewith, whereby the spaces a and b are perfectly partitioned. The tihgt engagement can be accomplished by mating an annular or concaved groove 11 provided on the inner peripheral surface of the broader opening of the upper member 7 with annular protruded or convexed part 9 surrounding the outer peripheral surface of the lower member 1.

Figure 3:
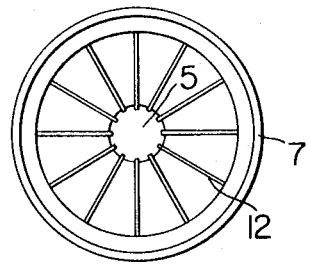
FIG. 3 is a plan view as viewed from bottom of the upper part of the device shown in FIG. 1, which shows the internal structure thereof.

The upper member 7 is further provided inside thereof with a plurality of guide plates or fins 12 to enable the extracted and filtered coffee liquid to flow out uniformly. The fins are radially arranged at an equal space interval between them as shown in FIG. 3.

In extracting and filtering coffee liquid from the ground coffee beans and hot water, the upper member 7 is detached from the lower member 1, and a required quantity of roasted and ground coffee beans is put in the lower member 1, thereafter a required quantity of hot water is poured into the coffee powder, and the opening is immediately closed by fitting the filter paper 4 without any delay, after which the upper member 7 is cap-engaged with the lower member 1. The interior of the device is substantially perfectly closed by this filtration paper into the upper space b and the lower space a.

As soon as the upper and lower members are engaged right after pouring hot water, vapour and gas (mainly carbon dioxide) are generated and the internal pressure of the coffee making device increases high. A part of the vapor and gas pressure is discharged outside through the air vent port 3, and the remaining part thereof transfers into the upper space b through the filtration paper 4 to adjust or even the pressure gradient in both spaces a and b, whereby floating or blowing-up of the upper member 7 due to the excess gas and vapor pressure can be prevented. Thus, the coffee aroma as extracted fills the whole chamber of the device (spaces a and b) without escaping outside.

In the subsequent step, the coffee making device is held by hands and gently shaked for several times in any direction to give appropriate vibration to the coffee powder and hot water within the lower member 1, whereby extraction of the coffee aroma from the coffee powder into hot water can be accelerated. Instead of shaking, if the imersion time of the coffee powder in hot water is prolonged by just leaving them as they are, it is of course possible to extract the coffee essence, but, at the same time, undesirable ingredients such as tannin, etc. also tend to be extracted, which inevitably depreciate the quality of the extracted coffee liquid. It should be noted herein that there exists great difference between shaking or giving vibration to the coffee powder and agitating the same. The mild vibration given to the coffee powder as done in the present invention accelerates elution (or dissolving out) of the coffee aroma, while mere agitation thereof only results in impairment of the aroma and taste of coffee.

As already mentioned in the foregoing, vapour and other gases generate within the chamber of the device as soon as hot water is poured onto coffee powder in the space a, and, at the same time, air within the chamber expands due to heat to increase the pressure therewithin. On account of this, elution of astringency and other undesirable ingredients in coffee powder which are rather slower to be extracted than the aroma is hingered and limpidity of the filtered coffee liquid can be well maintained, even though the total quantity of coffee powder is immersed in the total quantity of hot water at one time.

After shaking the bottle to sufficiently extract the coffee essence, the cap 6 is removed and filtered coffee liquid is poured on into a cup or any appropriate receptacle through the filtration paper 4 and the upper chamber b. Since hot water poured on into the lower chamber a is used to treat the coffee powder to extract the essence in an substantially tightly closed condition, and since the extraction and filtration time is very short, the coffee liquid can be maintained at an approrpriate temperature for immediate drink.

Another advantage of the coffee making bottle according to the present invention is that any grain size of the ground coffee beans can be used.

Thus, the present invention has been successful in overcoming the disadvantages inherent in the heretofore known method and apparatus for extracting and filtering coffee liquid, i.e., dependency on grain size of ground coffee beans to be used as well quantity thereof, troublesomeness in washing and cleaning the device after use. Moreover, the coffee making bottle according to the present invention is not only very simple in its structure, but also different in the method of making coffee from those already known. The effect derived from this invention is considered definitely meritorius.

What I claim is:

1. A coffee making bottle which consists of: a main cylindrical body with one end open, constituting a lower chamber, and provided at one portion thereof with a protruded member having therein a throughhole or port communicating said lower chamber with external air; a filter paper totally covering the opening of said main body and to filter extracted coffee liquid; a capping member with both ends open, one of which is broad and the other of which is narrow to constitute an outlet for extracted and filtered coffee liquid; and a cap to cover said narrow opening of the capping member, said capping member being detachably engageable with said main body at their peripheral edges thereof to form a substantially tiightly closed chambers for coffee extraction and filtration.

2. A coffee making bottle according to claim 1, in which said capping member is provided inside thereof with a plurality of guide plates or fins to secure uniform and smooth flow of coffee liquid out of the narrow outlet opening.

* * * * *

UNITED STATES PATENT OFFICE
CERTIFICATE OF CORRECTION

Patent No. 3,750,559        Dated August 7, 1973

Inventor(s) Hideo Wakabayashi

It is certified that error appears in the above-identified patent and that said Letters Patent are hereby corrected as shown below:

In the heading insert:

-- [30] Foreign Application Priority Data

October 31, 1970    Japan    96213/1970

October 31, 1970    Japan    108542/1970

Signed and sealed this 24th day of September 1974.

(SEAL)
Attest:

McCOY M. GIBSON JR.
Attesting Officer

C. MARSHALL DANN
Commissioner of Patents